Patented June 17, 1947

2,422,271

UNITED STATES PATENT OFFICE 2,422,271

POLYISOCYANATE MODIFIED POLYESTERAMIDES

Gordon T. Vaala and Charles E. Frank, Wilmington, Del., assignors to E. I. du Pont de Nemours & Company, Wilmington, Del., a corporation of Delaware No Drawing. Application December 17, 1943, Serial No. 514,658

12 Claims. (Cl. 260—42)

This invention relates to polymeric materials and more particularly to new products comprising polyester amides.

It is known that linear polyester amides, obtained by reacting as described more particularly hereinafter a dibasic carboxylic acid with complementary polyester amide-forming reactants, can be modified by treatment with a diisocyanate. These modified polymers possess valuable properties including toughness, rubberiness, oil resistance, and high flex durability. Difficulties in fabrication however constitute a serious hindrance to the commercial utilization of diisocyanate modified polyester amides, as they can be milled, calendered, and molded only with considerable difficulty. One solution to this problem involves the plasticization of the completely diisocyanate modified polymers by the incorporation of various resins, plasticizers, and fillers in order to obtain workability. Such plasticization is accomplished only at the expense of one or more of the attractive properties of the polymer, such as high tensile strength, solvent resistance, and high softening point. Furthermore, attempts to impart good working properties by such plasticization of certain of the more highly diisocyanate modified polyester amides have been completely unsuccessful.

This invention has as an object new and useful diisocyanate modified polyester compositions that can be further heat treated or cured to yield tough and durable non-thermoplastic products which have elasticity and pliability characteristics similar to those of vulcanized rubber. Further objects reside in methods for obtaining these compositions and products. Other objects will appear hereinafter.

The above objects are accomplished by incorporating with a polyester amide, modified with just enough polyisocyanate or polyisothiocyanate to yield a soluble and workable polymer, a thermosetting urea-formaldehyde monomeric alcohol condensation product, and a small amount of acidic material as a catalyst, forming the composition into the desired article, and then heating the article until it is infusible and insoluble.

The above mentioned polyisocyanate or polyisothiocyanate modified polyester amides used in the practice of this invention are preferably those obtained with the diisocyanate and are modified with just sufficient of the cyanate substance to yield soluble, workable compositions. These compositions, although lacking the toughness and durability of the completely modified diisocyanate polymers, can be cured with the urea-formaldehyde resin defined above to yield tough insolubilized, durable products. The unmodified polyester amides and those completely modified with diisocyanate are not suitable for the present purpose. The unmodified polymers are soluble but lack strength and durability and the completely modified polymers cannot be worked and fabricated by conventional means. The above mentioned urea-formaldehyde monohydric alcohol condensation product as compared to other possible curing agents, such as formaldehyde, is also of particular advantage in the practice of this invention from the standpoint of the process steps involved since the reaction is readily controlled and premature curing (scorching) during compounding and forming operations is not encountered.

The diisocyanate modified polymer used in the present process is obtained from the relatively low molecular weight polyester amides customarily having acid and hydroxyl numbers in the range of 3–30 and a molecular weight in the range of 2500–5000. This initially formed low molecular weight viscous liquid or wax-like reaction product of essentially stoichiometric proportions of amide and ester-forming reactants is heated at 50°–250° C. with a polyisocyanate in amounts of from 1% up to 10%, usually from 2% to 6%. This reaction results in the formation of a rubbery high molecular weight or superpolymer capable of being worked in conventional rubber equipment and soluble in certain mixed solvents such as chloroform-methanol and chloroform-acetone. It is accordingly capable of being milled, compounded, calendered, extruded, and molded, and is also adaptable to solution techniques of casting and spinning. The amount of polyisocyanate (or polyisothiocyanate) required within the mentioned limits is dependent upon the molecular weight and constitution of the initial polyester amide products and upon the molecular weight and number of cyanate groups per molecule of the polyisocyanate or polyisothiocyanate, and as previously indicated must be carefully regulated to avoid incompletely modified, weak products on the one hand and too highly converted non-workable products on the other.

The diisocyanate modified polyester amide obtained as described above is then admixed with an acidic catalyst and the urea-formaldehyde-monohydric alcohol condensation product and the resulting composition, after shaping as desired, is subjected to heat treatment which converts or cures it to tough, durable finished products. The resin and catalyst can be incorporated either by milling or by solution mixing. The cure is accomplished by heating in an oven or mold at 50°–200° C. for 10 minutes to 4 hours, and preferably at about 125° C. for 2 hours or until the reaction is substantially complete. The cured products resemble vulcanized rubber in appearance and are useful in a variety of applications.

The catalysts used in the practice of this invention are either weakly acidic materials such as phthalic anhydride or substances which although substantially neutral at room temperature evolve a strong acid upon heating to curing temperatures of 100°–160° C. Such useful curing catalysts include styrene dibromide, hydrobromocinnamic acid, 1-bromo-2-naphthol, trichloroacetamide, chloranil, 1,6-dibromo-2-naphthol, and vinyl chloride-dichloroethylene interpolymers. Acid acceptors for stabilizing the cured polymer against gradual degradation by traces of acid liberated by the curing catayist may be added in small quantities to the ester-amide composition before curing. The most useful of these are calcium carbonate and nickel carbonate.

The thermosetting urea-formaldehyde resins used as curing agents for the diisocyanate modified polyester amides are preferably prepared from the monohydric alcohol, urea and formaldehyde by the method described in United States Patent 2,191,957.

The reactants from which the polyester amides, which have recurring amide, ester, and urethane linkages, can be prepared include a variety of bifunctional materials containing hydroxyl, carboxyl, amino, and alkylamino groups, or materials capable of producing these groups. Thus diamines, glycols, dibasic acids, amino alcohols, amino acids, and hydroxy acids can be employed in any combination that will bring together the essential types of groups in stoichiometrical quantities. As examples may be mentioned the products formed by the reaction of (1) a dibasic acid, a diamine, and a glycol, or from (2) a dibasic acid, a glycol, and an amino alcohol, or from (3) an amino acid and a hydroxy acid, or from (4) a dibasic acid and an amino alcohol. In these reactions a dibasic carboxylic acid or its ester- or amide-forming derivative is reacted with a bifunctional complementary polyester amide-forming composition containing amino and hydroxyl groups in amounts such that substantially all the carboxyl groups appear in the final product as interlinear ester and interlinear amido groups. The initial low molecular weight reaction product of these ingredients will have free hydroxyl, amino, and carboxyl end groups and a plurality of ester and amide linkages in the chain. They lack in general the desirable properties of hardness, strength, elongation, elasticity, pliability, and flexibility. When these low molecular weight polyester amides are treated with a polyisocyanate, products of excellent toughness, pliability, and good thermoplasticity are obtained. These polymers for the best results should contain from 50% to 95% ester groups, based on the total ester and amide groups present.

The invention is further illustrated by the following examples in which the parts are by weight.

*Example I*

One hundred parts of hexamethylene diisocyanate modified polyester amide is compounded on rubber rolls at 50°–60° C. with 20 parts (solids) of a butanol-soluble urea-formaldehyde-butanol resin, 1 part of acidic catalyst consisting of styrene dibromide, 5 parts carbon black, and 1 part p-hydoxyphenyl morpholine as a stabilizer against heat and light. After thorough mixing, the composition is placed in a rubber mold and cured 1.5 hours at 125° C., then removed from the mold and cured 1 hour in a 125° C. oven. The resultant product resembles cured rubber in appearance and has the following physical properties:

Tensile strength_____lbs./sq. in__ 2,850
Elongation _____per cent__ 500
Recovery from 300% elongation
                                        per cent__ 99
Mar temperature_____° C__ 170
Solvent resistance, per cent volume increase after 1 week immersion at 25° C.:
    Gasoline _____ 3
    Water _____ 6
    Benzene _____ 53

The diisocyanate modified polyesteramide in the above example is obtained by the following procedure. A mixture of 8038 parts adipic acid, 2205 parts ethyleneglycol, 1222 parts ethanolamine, and 250 parts water is placed in an enamel autoclave fitted with an agitator, a packed distillation column, a nitrogen inlet tube, and a vacuum line to be used during the latter stages of the process. With constant stirring and while bubbling a stream of nitrogen through the solution, the materials are heated to a temperature of 130° C. when water distillation begins. The temperature is then gradually raised to 200° C., and when distillation slackens, the pressure is reduced to about 20 mm. Heating is continued at this pressure for about 15 hours. The final product is a highly viscous liquid which gradually sets to a soft waxy solid; acid number, 15; hydroxyl number, 23.

Diisocyanate modification of the initial polyesteramide product is accomplished by heating 100 parts of the polymer with 4 parts of hexamethylene diisocyanate in a Werner & Pfleiderer mixer for 1 hour. The reaction is initiated at 100° C., and after about one-half hour the temperature is gradually raised during the next one-half hour to 175° C. At this point the material has been converted to a rubbery product, readily adaptable to milling and compounding operations. The butanol modified urea-formaldehyde resin used in Example I is prepared in the following manner: 747 parts of 37.1% aqueous formaldehyde solution is adjusted to pH 8.6 and placed with 700 parts butanol and 252 parts urea in a reactor of the type described in United States Patent 2,191,957. The reaction mixture is heated to the boiling point and maintained at this temperature for one hour without removing any water. A solution of 10 parts phthalic anhydride in 50 parts of butanol and 100 parts of toluene is added slowly to the reaction mixture. Heating is continued. Water is separated from the distillate and the butanol returned to the reaction mixture until the temperature of the boiling mixture reaches 97° C. The product is then concentrated by distillation until it contains 60% solids. It may be further concentrated to 100% solids by vacuum or "flash" distillation, or by precipitation with a non-solvent such as naphtha.

*Example II*

One hundred parts of hexamethylene diisocyanate modified ethanolamine-ethylene adipate polymer prepared as in Example I is mixed on the rubber rolls with 60 parts of carbon black, 16 parts (solids) of a butanol-soluble urea-formaldehyde-butanol resin, 1.5 parts of styrene dibromide, 1 part of di-beta-naphthyl p-phenylenediamine, and 1 part of stearic acid. The composition is readily calendered, yielding a smooth, tough, rubbery sheet. Curing in an oven at 125° C. for 1.5 hours converts it to an attractive sheet having a tensile strength of 3300 lbs./sq. in. and elongation of 240%.

*Example III*

One hundred parts of methylene bis-(phenyl-4-isocyanate) modified ethanolamine-ethylene adipate polymer is mixed on the rubber rolls with 20 parts (solids) of a butanol-soluble urea-formaldehyde-butanol resin, 5 parts carbon black, 1.5 parts 1-brom-2-naphthol, and 1 part p-hydroxyphenyl morpholine. The product is cured one hour in a mold at 125° C. and 2.5 hours more in an oven at 125° C. The resultant elastic sheet has a tensile strength of 1370 lbs./sq. in. and an elongation of 282%. The diisocyanate modified polymer employed in this example is prepared by heating 150 parts of the relatively low molecular weight ethanolamine-ethylene adipate (obtained as in Example I) with 9 parts of methylene bis-(phenyl-4-isocyanate) at 80° C. for 45 minutes. The taffy-like material thus obtained is converted further to a rubbery millable product by heating at 120° C. for 1 hour.

*Example IV*

One hundred parts of diisocyanate modified polyester amide is compounded on rubber rolls with 10 parts (solids) of a methanol-soluble urea-formaldehyde-methanol resin, 50 parts carbon black, 1 part of copper dibutyl dithiocarbamate, 1.5 parts stearic acid, and 1.5 parts of 1-brom-2-naphthol. The material is then calendered into an unsupported sheet and oven cured two hours at 125° C. The product is a tough, pliable sheet, similar in appearance to that obtained in Example II. This is substantially insoluble and infusible.

The diisocyanate-treated polyester amide used in the foregoing example is prepared by heating a mixture of 409 parts of adipic acid, 103 parts of hexamethylenediammonium adipate (the salt of hexamethylenediamine and adipic acid), 175.5 parts of ethylene glycol, and 50 parts of water at 200° C. in a stirred, heated, enamel lined reactor; water distills from the reaction solution and heating is continued until the product has attained an acid number of 23. This product is then treated with 23.4 parts of hexamethylene diisocyanate to obtain a fusible workable polymer which is soluble in an equivalent mixture of methanol and chloroform.

The initially formed lower molecular weight polymers to be acted upon by the diisocyanate are made from ingredients comprising a dibasic carboxylic acid, with at least one complementary bifunctional compound, or a mixture of bifunctional compounds, comprising at least one esterifiable hydroxy group and at least one hydrogen bearing amino group. As in the production of the polyester amides generally the dibasic carboxylic acid can be replaced with the equivalent ester-forming derivative, for example, by a halide anhydride, or an ester with a volatile monohydric alcohol. The dibasic carboxylic acids or ester-forming derivatives thereof useful for making the low polymers which are acted upon by the diisocyanate comprise carbonic, malonic, succinic, maleic, glutaric, suberic, azelaic, beta-methyl adipic, hexahydroterephthalic, diphenic, p-phenylenediacetic, thiodibutyric, acetone dicarboxylic, diglycolic, pimelic, undecanedioic, isophthalic, brassylic, 6-ketoundecanedioic, and 4-ketopimelic acids and anhydrides, acid halides, half-esters, and diesters thereof. The best results are obtained with those dibasic acids having the formula HOOC—R—COOH wherein R represents a saturated divalent hydrocarbon radical with a chain length of at least four carbon atoms.

The second essential component of the low molecular weight polymer is a complementary bifunctional compound or a mixture of bifunctional compounds, comprising at least one esterifiable hydroxy group and at least one hydrogen-bearing amino group. Thus, this second component may comprise amino alcohols, mixtures of glycols and diamines, mixtures of glycols and amino alcohols, mixtures of amino alcohols and diamines, or mixture of all three. Likewise, mixtures of amino acids and hydroxy acids may be used per se.

Any glycol can be employed in the formation of the low polymer, including, in addition to those indicated in the examples, diethylene glycol, triethylene glycol, pentamethylene glycol, hexamethylene glycol, decamethylene glycol, and N,N-diethanol aniline.

Any amino alcohol having at least one hydrogen atom attached to the aminonitrogen atom can be employed, including aromatic amino alcohols, for example, p-hydroxymethylbenzylamine, 4 - hydroxymethyl-4-aminomethyldiphenyl, and p-aminophenylethyl alcohols; aliphatic amino alcohols, for example, 5-aminopentanol-1, 6-amino-5-methylhexanol-1, 4 - p - aminophenylcyclohexanol, hydroxyethoxyethoxyethoxyethylamine, and N-beta-aminoethyl-N-omega-hydroxyhexyl aniline. The preferred amino alcohols are of formula HO—R—NH2 where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

Any polymerizable monohydroxymonocarboxylic acid or ester-forming derivative thereof can be employed. The preferred hydroxy acids are of formula HO—R—COOH where R represents saturated divalent hydrocarbon radicals, for example, 6-hydroxycaproic, 10-hydroxydecanoic, and 12-hydroxystearic acid.

Any polymerizable monoaminomonocarboxylic acid or ester-forming derivative thereof can be employed, including 6-aminocaproic, 9-aminononanoic, and 11-undecanoic, and 12-aminostearic acids, caprolactam, etc. Various derivatives of the linear polymer-forming reactants previously mentioned can be used. A number of available compounds, for example, can replace the amino acids, diamines, and dicarboxylic acids, and as in the case of the dibasic acids, it is to be understood that mention herein of these reactants is intended to include their equivalent amide-forming derivatives. Amide-forming derivatives of the amino acids include the ester, anhydrides, amides, lamtams, acid halides, N-formyl derivatives, carbamates, and nitriles in the presence of water. Amide-forming derivatives of the dicarboxylic acids comprising mono- and diesters, the anhydrides, the mono- and diamides, acid halides, and following compounds in the presence of water: nitriles, cyancarboxylic acids, cyanoamides, and cyclic imides. Amide-forming derivatives of the diamines include the carbamates, N-formyl derivatives, and the N,N'-diformyl derivatives.

In addition to the illustrative diisocyanates mentioned in the above examples, any polyisocyanate or polyisothiocyanate can be used, including monoisocyanate-monoisothiocyanates, i. e., any compound of the general formula XCNRNCY where X and Y are selected from the group consisting of sulfur and oxygen and R is a divalent organic radical. These compounds comprise ethylene diisocyanate, trimethylene diisocyanate, tetramethylene diisocyanate, hexamethylene diisocyanate, decamethylene diisocyanate, heptylidene diisocyanate and the corresponding diisothiocyanates; cycloalkylene diisocyanate and diisothiocyanate, for example, cyclopentylene diisocyanate, cyclohexylene diisocyanate; aromatic diisocyanates and diisothiocyanate, for example, m-phenylene diisocyanate, naphthalene diisocyanate, and diphenyl-4,4'-diisocyanate; aliphatic-aromatic diisocyanates and diisothiocyanates, for example, xylene-1,4-diisocyanate and 4,4'-diphenylenemethane diisocyanate; and diisocyanates and diisothiocyanates containing hetero atoms, such as $$SCNCH_2OCH_2NCS$$

and $SCN—(CH_2)_3—S—(CH_2)_3NCS$.

The preferred diisocyanates and diisothiocyanates are of the type OCN—R—NCO and SCN—R—NCS, wherein R represents saturated divalent hydrocarbon radicals with a chain length of at least two carbon atoms. Of these the polymethylene derivatives are preferred.

The modifying material for the polyester amides is particularly described in connection with the diisocyanates and diisothiocyanates which also include compounds having both isocyanate and isothiocyanate groups and which are expressed by the formula $R(NCX)n$ where X is oxygen or sulfur and $n$ is a plural integer, i. e., more than 1. Compounds of this kind are benzene-1,2,4-triisothiocyanate and 1,2,2-triisocyanaphthiobutane.

In ratio of urea-formaldehyde and combined alcohol in the monohydric alcohol modified urea-formaldehyde resins can be varied from 1:1.5:0.5 to 1:3:2. The monohydric alcohols containing 1-6 carbon atoms are most suitable for use in the preparation of these resins. As well understood in the production of these resins, thiourea, melamine as well as various other substituted ureas and derivatives can be used.

The amount of the curing urea-formaldehyde resin (on a solids basis) should be at least 5% of the weight of the polyester amide and should not exceed the weight of the polyester amide. Preferably the amount of curing agent on this basis should be 10-50% of the weight of the polyester amide. The particular amount employed in any instance will depend upon the nature of polyester amide used, upon the degree of curing desired, and upon the temperature and time of curing. The curing agent may be added to the polymer either in the solid form or as a solution; in the latter case the solvent may be removed by evaporation during milling. Somewhat higher concentrations of curing agent are required if a plasticizer containing hydroxyl groups, or active amido hydrogens, is used, since these groups will consume some of the curing agent.

Fillers and extenders useful in the present products include carbon black, clay, blanc fixe, wood flour, vermiculite, mica, leather dust, asbestos, silica, cellulose derivatives, etc. Whiting and lithopone are suitable in small amounts, but in heavy loadings tend to retard cure. More strongly basic materials, such as lime, zinc oxide, and litharge, are not generally employed because of their tendency to degrade the polymer on aging. Suitable pigments include chrome green, Prussian blue, iron oxide, lithol red, azo pigments, and the phthalocyanines. Other polymers, resins, and modifiers possessing groups capable of reacting with a diisocyanate may be added to the polyester amides prior to the treatment with the diisocyanate, thereby yielding compositions interpolymerized by the reaction of the polyfunctional isocyanates.

In order to improve flow and to facilitate sheeting and extruding operations, it is advantageous for some purposes to incorporate other modifying agents, such as waxes and resins in addition to those mentioned above. Materials particularly suitable include dimethyl sebacate, polyethylene glycol, and polyvinyl acetate. Resins obtained by reacting formaldehyde with p-tert.-butyl phenol, p-hydroxydiphenyl, p-tert.-amyl phenol, and o-cyclohexyl phenol, and also other resinous substances such as rosin and its derivatives, shellac, and copal, may be incorporated to improve water resistance and to increase hardness as well as to improve milling properties of the product.

It is desirable that stabilizers be incorporated to improve the resistance of polyester amides to degradation by heat, light, and outdoor exposure. These agents comprise selected pigments such as iron oxide and carbon black; various salts and complexes, particularly those of metals of the transition series, such as cobalt phthalocyanine, copper dibutyl dithiocarbamate, cuprous pinane mercaptide, manganese lactate, and cobalt dibutyl dithiocarbamate; aromatic amines and amino phenols such as p-hydroxylphenyl morpholine, di-beta-naphthol p-phenylenediamine, di-o-tolylguanidine dicatechol borate, p,p'-dimethoxydiphenylamine, and phenyl-beta-naphthyl-amine; phenols such as catechol, p-tert.-butyl catechol, and hydroquinone; phenol-formaldehyde resins.

In sheeting, calendering, and extruding operations, it is frequently desirable to incorporate anti-sticking agents into the polyester amides to facilitate release of the material from the working surface of the equipment. To accomplish this, it has been found useful to add small quantities of such materials as carnauba wax, diamyl phthalate, dioctyl phthalate, dilauryl phthalate, diethylene glycol dicresyl ether, ethylene glycol monobenzyl ether, stearic acid, oleic acid, sodium stearate, zinc stearate, aluminum stearate, dibutyl ammonium oleate, and dibutyl ammonium stearate.

The ability to fabricate and cure polyester amides in the manner described by this invention adapts these polymers to a wide field of utility. Like rubber, and in conventional rubber equipment, they may be worked, compounded, molded, extruded, sheeted, and calendered onto fabrics. Like rubber, they are converted by the process described herein to the tough, durable, substantially non-thermoplastic and insoluble final products. This curing can be accomplished either in a mold or in hot air. The products possess marked superiority over rubber with regard to gasoline and oil resistance, hydrogen impermeability, and resistance to oxygen.

The tough, high molecular weight polymers obtained by this invention are particularly useful for the production of fibers, films, sheeting, tubing, molded articles, and coating compositions for cloth, wire, metal, paper, leather, and wood. Furthermore, they are adaptable to the manufacture of safety glass interlayers, since they may be molded into clear, tough, elastic sheets which adhere tenaciously to glass.

The coated fabrics obtainable by this invention are extremely pliable over a wide temperature range, possess unusual resistance to solvents, greases, and oil, and due to the inherent light color of the polyester amides can be prepared in any shade or color. The latter property is particularly desirable since most materials which are of practical value in fabric coatings are rather highly colored, and light colored coatings, tints, and pastel shades cannot therefore be obtained. The coated fabrics of this invention are unusually durable as is shown by their high resistance to failure under flexural, scrub, or abrasive action.

The improved coated fabrics obtained in the course of this invention can be employed in almost any application wherein coated fabrics or leather are now used, particularly where oil and grease resistance and flex durability are desired. Products of this kind include balloon fabrics, collapsible lifeboats, upholstery, shoe uppers, luggage, hospital sheeting, mine vent tubes, handbags, bill folds, vehicle covers, fuel pump diaphragms, flanges, refrigerator gaskets, shower curtains, sports jackets, raincoats, work clothes for use in the oil and dairy industries, and aprons for food dispensers.

As many apparently widely different embodiments of this invention may be made without departing from the spirit and scope thereof, it is to be understood that we do not limit ourselves to the specific embodiments thereof except as defined in the appended claims.

We claim:

1. A process for obtaining tough, durable high molecular weight polymeric products which comprises incorporating a catalyst and the resinous condensation product of urea-formaldehyde and a monohydric alcohol with the thermoplastic, organic solvent soluble, rubbery and millable reaction product of a linear polymeric polycarboxylic ester carbon amide containing ester and carbon amide groups interlinearly in the polymer chain and a cyanate substance and heating the composition thus obtained until the resulting product is essentially non-thermoplastic and insoluble, said resinous condensation product being present in amount of from 5% to 100% based on the weight of said carbon amide, the ratio of urea, formaldehyde, and monohydric alcohol combined in said resinous condensation product being within the range of from 1:1.5:0.5 to 1:3:2, said cyanate substance being present in amount of from 1% to 10% by weight of said carbon amide and being selected from the group consisting of organic polyisocyanates and organic polyisothiocyanates, said catalyst being selected from the group consisting of weakly acidic materials and substances which yield strong acids when heated to a temperature of from 100° to 160° C.

2. A process for obtaining tough, durable high molecular weight polymeric products which comprises incorporating a catalyst and the resinous condensation product of urea-formaldehyde and butanol with the thermoplastic, organic solvent soluble, rubbery and millable reaction product of a linear polymeric polycarboxylic ester carbon amide containing ester and carbon amide groups interlinearly in the polymer chain and a cyanate substance and heating the composition thus obtained until the resulting product is essentially non-thermoplastic and insoluble, said resinous condensation product being present in amount of from 5% to 100% based on the weight of said carbon amide, the ratio of urea, formaldehyde, and butanol combined in said resinous condensation product being within the range of from 1:1.5:0.5 to 1:3:2, said cyanate substance being present in amount of from 1% to 10% by weight of said carbon amide and being selected from the group consisting of organic polyisocyanates and organic polyisothiocyanates, said catalyst being selected from the group consisting of weakly acidic materials and substances which yield strong acids when heated to a temperature of from 100° to 160° C.

3. A process for obtaining tough, durable high molecular weight polymeric products which comprises incorporating a catalyst and the resinous condensation product of urea-formaldehyde and a monohydric alcohol with the thermoplastic, organic solvent soluble, rubbery and millable reaction product of a linear polymeric polycarboxylic ester carbon amide containing ester and carbon amide groups interlinearly in the polymer chain and an organic diisocyanate and heating the composition thus obtained until the resulting product is essentially non-thermoplastic and insoluble, said diisocyanate being present in amount of from 1% to 10% by weight of said carbon amide, said resinous condensation product being present in amount of from 5% to 100% based on the weight of said carbon amide, the ratio of urea, formaldehyde, and monohydric alcohol combined in said resinous condensation product being within the range of from 1:1.5:0.5 to 1:3:2, said catalyst being selected from the group consisting of weakly acidic materials and substances which yield strong acids when heated to a temperature of from 100° to 160° C.

4. A process for obtaining tough, durable high molecular weight polymeric products which comprises incorporating a catalyst and the resinous condensation product of urea-formaldehyde and butanol with the thermoplastic, organic solvent soluble, rubbery and millable reaction product of a linear polymeric polycarboxylic ester carbon amide containing ester and carbon amide groups interlinearly in the polymer chain and an organic diisocyanate and heating the composition thus obtained until the resulting product is essentially non-thermoplastic and insoluble, said diisocyanate being present in amount of from 1% to 10% by weight of said carbon amide, said resinous condensation product being present in amount of from 5% to 100% based on the weight of said carbon amide, the ratio of urea, formaldehyde, and butanol combined in said resinous condensation product being within the range of from 1:1.5:0.5 to 1:3:2, said catalyst being selected from the group consisting of weakly acidic materials and substances which yield strong acids when heated to a temperature of from 100° to 160° C.

5. A process for making polymeric products similar in properties to cured or vulcanized rubber, said process comprising shaping to desired form a composition consisting preponderately of the thermoplastic, organic solvent soluble, rubbery and millable high molecular weight reaction product of a low molecular weight wax-like linear polymeric polycarboxylic ester carbon amide containing ester and carbon amide groups interlinearly in the polymer chain with from 1% to 10% of a cyanate substance, a catalyst, and from 5% to 100%, based on the weight of said carbon amide, of the thermosetting resinous condensation product of urea-formaldehyde and a monohydric alcohol in the ratio of urea, formaldehyde and monohydric alcohol within the range of from 1:1.5:0.5 to 1:3:2, heating the shaped compositions at a temperature of 50° C. to 200° C., and continuing said heating until a tough, essentially non-thermoplastic and insoluble product is obtained, said cyanate substance being selected from the group consisting of organic polyisocyanates and organic polyisothiocyanates, said catalyst being selected from the group consisting of weakly acidic materials and substances which yield strong acids when heated to a temperature of from 100° to 160° C.

6. A process for making polymeric products similar in properties to cured or vulcanized rubber, said process comprising shaping to desired form a composition consisting preponderately of the thermoplastic, organic solvent soluble, rubbery and millable high molecular weight reaction product of a low molecular weight wax-like linear polymeric carboxylic ester carbon amide containing ester and carbon amide groups interlinearly in the polymer chain with from 1% to 10% of a cyanate substance, a catalyst, and from 5% to 100% based on the weight of said carbon amide, of the thermosetting resinous condensation product of urea-formaldehyde and butanol in the ratio of urea, formaldehyde, and butanol within the range of from 1:1.5:0.5 to 1:3:2, heating the shaped composition at a temperature of 50° C. to 200° C., and continuing said heating until a tough, essentially non-thermoplastic and insoluble product is obtained, said cyanate substance being selected from the group consisting of organic polyisocyanates and organic polyisothiocyanates, said catalyst being selected from the group consisting of weakly acidic materials and substances which yield strong acids when heated to a temperature of from 100° to 160° C.

7. A process for making polymeric products similar in properties to cured or vulcanized rubber, said process comprising shaping to desired form a composition consisting preponderately of the thermoplastic, organic solvent soluble, rubbery and millable high molecular weight reaction product of a low molecular weight wax-like linear polymeric carboxylic ester carbon amide containing ester and carbon amide groups interlinearly in the polymer chain with from 1% to 10% of an organic diisocyanate, a catalyst and from 5% to 100%, based on the weight of said carbon amide, of the thermosetting resinous condensation product of urea-formaldehyde and monohydric alcohol, in the ratio of urea, formaldehyde, and monohydric alcohol in within the range of from 1:1.5:0.5 to 1:3:2, heating the shape composition at a temperature of 50° C. to 200° C., and continuing said heating until a tough, essentially non-thermoplastic and insoluble product is obtained, said catalyst being selected from the group consisting of weakly acidic materials and substances which yield strong acids when heated to a temperature of from 100° to 160° C.

8. A process for making polymeric products similar in properties to cured or vulcanized rubber, said process comprising shaping to desired form a composition consisting preponderately of the thermoplastic, organic solvent soluble, rubbery and millable high molecular weight reaction product of a low molecular weight wax-like linear polymeric carboxylic ester carbon amide containing ester and carbon amide groups interlinearly in the polymer chain with from 1% to 10% of an organic diisocyanate, a catalyst and from 5% to 100%, based on the weight of said carbon amide, of the thermosetting resinous condensation product of urea-formaldehyde and butanol in the ratio of urea, formaldehyde and butanol within the range of from 1:1.5:0.5 to 1:3:2, heating the shaped composition at a temperature of 50° C. to 200° C., and continuing said heating until a tough, essentially non-thermoplastic and insoluble product is obtained, said catalyst being selected from the group consisting of weakly acidic materials and substances which yield strong acids when heated to a temperature of from 100° to 160° C.

9. A tough, essentially non-thermoplastic insoluble high molecular weight polymeric product which is obtained by the process set forth in claim 1.

10. A tough, essentially non-thermoplastic insoluble high molecular weight polymeric product which is obtained by the process set forth in claim 2.

11. A tough, essentially non-thermoplastic insoluble high molecular weight polymeric product which is obtained by the process set forth in claim 5.

12. A tough, essentially non-thermoplastic insoluble high molecular weight polymeric product which is obtained by the process set forth in claim 6.

GORDON T. VAALA.
CHARLES E. FRANK.

REFERENCES CITED

The following references are of record in the file of this patent:

UNITED STATES PATENTS

| Number | Name | Date |
|---|---|---|
| 2,227,223 | Hodgins et al. | Dec. 31, 1940 |
| 2,201,892 | Edgar et al. | May 21, 1940 |
| 2,275,008 | Coffman | Mar. 3, 1942 |
| 2,333,917 | Christ et al. | Nov. 9, 1943 |